(12) United States Patent
Nakata et al.

(10) Patent No.: US 8,534,337 B2
(45) Date of Patent: Sep. 17, 2013

(54) HIGH FREQUENCY SEWING MACHINE

(75) Inventors: Norio Nakata, Toyonaka (JP); Masaki Okamoto, Toyonaka (JP); Itsuo Sakai, Toyonaka (JP)

(73) Assignee: Yamato Sewing Machine Seizo Co., Ltd., Osaka (JP)

( * ) Notice: Subject to any disclaimer, the term of this patent is extended or adjusted under 35 U.S.C. 154(b) by 242 days.

(21) Appl. No.: 12/804,929

(22) Filed: Aug. 2, 2010

(65) Prior Publication Data

US 2011/0048645 A1 Mar. 3, 2011

(30) Foreign Application Priority Data

Jul. 31, 2009 (JP) ................................. 2009-192534
Apr. 23, 2010 (JP) ................................. 2010-113646

(51) Int. Cl.
*B32B 37/06* (2006.01)
(52) U.S. Cl.
USPC ...................................................... 156/380.6
(58) Field of Classification Search
USPC ........... 156/379.6, 380.2, 380.3, 380.4, 380.6
See application file for complete search history.

(56) References Cited

U.S. PATENT DOCUMENTS

| | | | | |
|---|---|---|---|---|
| 2,322,298 A | * | 6/1943 | Johnston | 156/555 |
| 2,539,646 A | * | 1/1951 | Welch, Jr. | 219/768 |
| 2,681,976 A | * | 6/1954 | Mellen | 219/768 |
| 5,118,275 A | * | 6/1992 | Andersson | 425/174.8 R |
| 6,095,071 A | * | 8/2000 | Kozima et al. | 112/470.01 |
| 6,308,647 B1 | * | 10/2001 | Okabe et al. | 112/272 |
| 2008/0078314 A1 | * | 4/2008 | Lau | 112/235 |

FOREIGN PATENT DOCUMENTS

| | | | |
|---|---|---|---|
| JP | 6-155576 | | 6/1994 |
| JP | 6-218819 | | 8/1994 |
| JP | 2006051169 A | * | 2/2006 |
| JP | 4022539 | | 10/2007 |

* cited by examiner

*Primary Examiner* — Daniel McNally
(74) *Attorney, Agent, or Firm* — D. Peter Hochberg; Sean F. Mellino (57) ABSTRACT

A high frequency sewing machine for intermittently transferring a work material mounted on a work material mounting plate by means of feed dogs which perform synthetic circular movement in horizontal and vertical directions and which cooperate with a presser foot to effect the continuous bonding of the overlapped portions of a fiber cloth which are continuously bonded together by means of a thermoplastic resin tape held between the overlapped portions of the fiber cloth in the work material to melt under high frequency dielectric heating. High frequency power is applied between a pair of planar electrodes respectively disposed above and below the work material during the time when the transfer by these feed dogs is stopped to effect the melting process. The occurrence of defective products having burn or the like due to heat concentration can be prevented while obtaining assured uniform bonding strength by using the high frequency power. Additionally, the bonding of curvilinear portions and the bonding of stretchable fiber clothes can be sufficiently handled.

11 Claims, 7 Drawing Sheets

HIGH FREQUENCY SEWING MACHINE

CROSS-REFERENCE TO RELATED APPLICATION

This application claims foreign priority based on Japanese Patent Application Serial No. 2010-113646 filed Apr. 23, 2010, which claims priority of Japanese Serial No. 2009-192534 filed Jul. 31, 2009.

BACKGROUND OF THE INVENTION

Field of the Invention

The present invention relates to a high frequency sewing machine used for manufacturing and processing apparel products (textile products) such as women's clothing, children's clothing and men's clothing in which clothes of natural fibers represented by cotton, wool, silk, or the like, or synthetic fibers represented by polyester, nylon, acryl, or the like (hereinafter referred to as "fiber clothes" in the present application) are used as object materials, and overlapped portions such as the overlapped ends of these fiber clothes are bonded (welded) together through a thermoplastic resin tape melt under high frequency dielectric heating.

As this type of high frequency sewing machine, a large number of ones have been developed and have come in practice in which a work material itself is for example a thermoplastic synthetic resin sheet such as of vinyl chloride resin or a synthetic resin film, and the overlapped portions of the work material are welded. These high frequency sewing machines are required to include only a transfer means for transferring the resin sheet or the resin film as a work material along the longitudinal direction of the overlapped portions; and a pair of electrodes for applying high frequency power to the overlapped portions of the resin sheet or the resin film transferred by the transfer means. Compared to general sewing machines which sew together the fiber clothes by forming seams by lacing or looping sewing threads such as a needle thread (upper thread), a looper thread, a lower thread, it is possible to omit the use of a plurality of complicated mechanisms and parts for constituting the sewing construction, for example, the constructions required in these sewing machines, such as feed dogs for transferring a fiber cloth in the sewing advance direction, a needle and a needle vertical reciprocal movement mechanism for causing the thread to pass through the fiber cloth, a rotary hook for supplying the lower thread and a hook operating mechanism for lacing and looping, or a looper and a looper operating mechanism for supplying the looper thread. That is, the whole structure of the sewing machine can be simplified.

DESCRIPTION OF THE PRIOR ART

In the existing high frequency sewing machines having a simpler construction than the general sewing machines, a means for bonding the overlapped portions of a work material (a thermoplastic resin sheet or a resin film) in which the work material itself is melted under high frequency dielectric heating by applying high frequency power between a pair of upper and lower electrode rollers while continuously transferring the work material held between the pair of electrode rollers in a certain direction has heretofore been employed as disclosed in Japanese Unexamined Patent Application Publications Nos. 6-218819 and 6-155576.

As disclosed in Japanese Patent No. 4022539, the high frequency sewing machine has also been proposed in which a pair of upper and lower electrode rollers for transferring a work material in a certain direction while holding it therebetween are intermittently rotated by interlockingly connecting these rollers to a drive motor through a movement conversion mechanism including a one-way transmission clutch.

In each of these conventional high frequency sewing machines disclosed in Japanese publications Nos. 6-218819 and 6-155576 and Japanese patent No. 4022539, the contact portions of the pair of electrode rollers make a line contact limited to the roller width (point contact when viewed in the transfer direction of the work material). To obtain assured bonding strength even under the line contact or the point contact, it is necessary to take either one of the means for setting the applied high frequency power to a high value and the means for decreasing the transfer rate of the work material.

In the means for enhancing the value of high frequency power, the heat of the enhanced high frequency power is concentratedly exerted on the line or point contact portions, so that the work material is susceptible to insulation breakdown, causing defective portions such as burn and burn holes (scorches). Particularly, when the work material is a thin fiber cloth that is the object material of the present invention, there is the problem that the burn range is likely to momentarily expand and hence a large number of defective products are manufactured. In the case of employing the means for decreasing the transfer rate of the paired electrode rollers by setting a low value of high frequency power, there is the problem that processing efficiency is extremely deteriorated. As disclosed in Japanese Patent No. 4022539, these problems due to the line or point contact occur similarly even when employing the construction where the paired electrode rollers are intermittently rotated, and the occurrence of defective products and the deterioration of processing efficiency are unavoidable.

In manufacturing and processing apparel products using the fiber clothes as the object material, in many cases, it is required to bond curvilinear portions as in women's underwear or the like. There are also many cases of using stretchable fiber clothes. Sewing machines used for manufacturing and processing the apparel products should be able to handle the bonding of the curvilinear portions and the bonding of the stretchable fiber clothes. However, the conventional high frequency sewing machines adapted to linearly transfer a work material in a certain direction with the work material held between the paired electrode rollers cannot sufficiently handle the bonding of the curvilinear portions and the bonding of the stretchable fiber clothes. That is, the conventional high frequency sewing machines using the paired electrode rollers are suitable for the bonding process of the overlapped portions while linearly transferring unstretchable work material such as resin sheets, but unsuitable for manufacturing and processing the apparel products in which the fiber clothes are used as the object materials, and the bonding of curvilinear portions is frequently performed, and the stretchable materials are frequently used. Hence, it can be said to be substantially impossible that the conventional high frequency sewing machines are directly applied to the bonding of the fiber clothes.

SUMMARY OF THE INVENTION

In view of the foregoing circumstances, the present invention has for its object to provide a high frequency sewing machine which is capable of obtaining the assured uniform bonding strength by using high frequency power, and preventing the manufacturing and processing of defective products having burn, burn holes or the like, and also satisfactorily handling the bonding of curvilinear portions or stretchable fiber clothes.

The high frequency sewing machine according to the present invention includes a work material mounting plate which is attached to an upper wall of a sewing machine bed section and slidingly movably mounts a work material with a thermoplastic resin tape interposed between overlapped portions of a fiber cloth; an intermittent transfer device which is disposed in the bed section below the work material mounting plate and alternately repeats a mode for abutting against the lower surface of the work material mounted on the work material mounting plate and transferring the work material along a horizontal surface in a specific processing advance direction, and a mode for separating from the lower surface of the work material and stopping the transfer of the work material; a presser foot which cooperates with the intermittent transfer device to transfer the work material in the processing advance direction and reciprocally moves up and down to resiliently press the work material during the transfer stopping time; and an upper planar electrode which is disposed above the work material mounting plate and reciprocally moves up and down, and a lower planar electrode which is disposed and secured in the bed section below the work material mounting plate and has an electrode surface flush with the upper surface of the work material mounting plate. In a state where the work material is held between the upper planar electrode and the lower planar electrode by moving down the upper planar electrode during the time when the transfer by the intermittent transfer device is stopped, the overlapped portions of the fiber cloth are continuously bonded together by allowing the thermoplastic resin tape to melt under high frequency dielectric heating by applying high frequency power between the paired upper and lower planar electrodes.

According to the high frequency sewing machine thus constructed, while intermittently transferring the work material including the fiber cloth along the horizontal surface by the cooperation between the intermittent transfer device and the presser foot, the heat obtained from the high frequency output applied between the paired upper and lower planar electrodes during the transfer stopping time is transmitted to the thermoplastic resin tape held between the overlapped portions of the fiber cloth. Thereby, the overlapped portions of the fiber cloth can be sequentially bonded by allowing the resin tape to melt planarly, namely, for each certain area. It is also capable of repetitively bonding the same portion. Assured uniform bonding strength is achieved by repetitive bonding under application of low high-frequency power, and the heat obtained from the high frequency power can be distributed into the surface contact portions of the paired electrodes without being concentrated in linear or point contact portions. It is therefore capable of avoiding the occurrence of defective portions such as burn or burn holes (scorches) of the fiber cloth due to concentration of the heat obtained from the high frequency power into a minute area. Along with the assured uniform bonding strength as described above, satisfactorily finished apparel products can be surely manufactured and processed if the object material is a fiber cloth that is weak against heat.

Additionally, the transfer means of the work material is one which is achieved by the cooperation between the intermittent transfer device alternately repeating the mode for abutting against the lower surface of the work material mounted on the work material mounting plate and transferring the work material along the horizontal surface in the specific processing advance direction, and the mode for separating from the lower surface of the work material and stopping the transfer of the work material; and the presser foot which presses the work material toward the work material mounting plate so as not to rise during the transfer by the intermittent transfer device. It is therefore capable of optionally changing the direction of the work material against the pressing force of the presser foot during the transfer stopping time. It is also easy to perform any optional curvilinear transfer besides linear transfer. Even when handling the stretchable fiber cloth, the fiber cloth can be transferred as it is without exerting excess clamping force. That is, the bonding of curvilinear portions and the bonding of stretchable fiber clothes can be sufficiently handled. This produces the effect of provision of the high frequency sewing machine extremely suitable and practical for manufacturing and processing the apparel products having many curvilinear portions and frequently using the stretchable fiber cloth.

In the high frequency sewing machine according to the present invention, it is preferable to use as the intermittent transfer device an intermittent transfer device comprised of feed dogs disposed in slot-like elongated holes formed in the work material mounting plate, and a feed dog drive mechanism for subjecting the feed dogs to synthetic circular movement in vertical and horizontal directions within the slot-like elongated holes.

In this case, it is possible to directly and effectively utilize the manufacturing technique and assembly technique already established for well-known intermittent transfer devices comprised of feed dogs and a feed dog drive mechanism, which are included in a conventionally known general sewing machine. This minimizes burdens on design and production, for example, the development and manufacturing of a special intermittent transfer device intended for the high frequency sewing machine, and considerable changes of the sewing machine bed section in the general sewing machine in order to assemble the special intermittent transfer device. This improves the productivity of the high frequency sewing machine as a whole and reduces the manufacturing costs thereof, thus achieving the high frequency sewing machine having high performance and high quality.

In the high frequency sewing machine according to the present invention, it is preferable that the presser foot also serve as the upper planar electrode of the paired upper and lower planar electrodes.

In this case, the presser foot performing the intermittent transfer of the work material in cooperation with the intermittent transfer device can also serve as the upper planar electrode, thereby eliminating the need to dispose the upper electrode separately from the presser foot. This reduces the number of components, and requires no special devices for separately arranging and fixing the upper electrode at the location of the presser foot and for insulating the presser foot, thereby achieving a further simplified entire structure and further cost reduction.

In the high frequency sewing machine according to the present invention, the work material mounting plate, and a part of the intermittent transfer means which abuts against the lower surface of the work material, or the feed dogs are made of a material having electrical insulating properties and heat resistance, such as engineering plastic.

This ensures sufficient structural strength of the work material mounting plate and the part of the intermittent transmit means which abuts against the lower surface of the work material, or the feed dogs. This also imparts excellent wear resistance, corrosion resistance, electrical insulating properties and heat resistance, thereby improving the durability of the individual components used under circumstances where the high frequency power is applied.

In the high frequency sewing machine according to the present invention, preheating heaters are preferably annexed to the paired upper and lower planar electrodes, respectively.

In this case, the upper and lower electrodes can be retained at a predetermined temperature by preheating them during the time when the transfer by the intermittent transfer device is stopped. Therefore, the resin tape can be surely melted and the predetermined bonding strength can be obtained stably while more surely preventing spark occurrence by minimizing high frequency power applied to these electrodes.

In the high frequency sewing machine according to the present invention in which the presser foot also serves as the upper planar electrode, it is preferable that between the presser foot also serving as the upper planar electrode, and a heater retainer which retains the preheating heater for preheating the presser foot and is fixedly attached to a sewing machine body, a heat conductive member be interposed for connecting the presser foot and the heat retainer so that both can relatively slide up and down.

In this case, the increase in the weight of the presser foot (the upper electrode) is minimized to achieve a smooth transfer of the work material and facilitate the operation for curvilinear transfer. Additionally, the heat of the preheating heaters can be efficiently transmitted to the presser foot through the heat conductive member. Owing to the effect of preheating these electrodes, it is capable of preventing the occurrence of spark and ensuring stable bonding strength.

In the high frequency sewing machine according to the present invention, the outer shell of the sewing machine bed section may be formed in a substantially tubular shape when viewed from a direction orthogonal to the processing advance direction. Alternatively, the hole of the bed surface including the work material mounting plate may be shaped as a substantially rectangular flat surface.

In the application to a sewing machine having a so-called tubular bed whose outer shell is formed in the substantially tubular shape as in the former case, it is extremely convenient for handling the work material when bonding relatively small tubular portions such as cuffs and necks. In the application to a so-called flatbed sewing machine whose entire bed surface is shaped as the substantially rectangular flat surface as in the latter case, when bonding a large work material that is difficult to handle, a predetermined bonding can be surely carried out with the work material stably supported on the large flat bed surface.

These and other characteristic features of the present invention and the effects thereof will become apparent from the following description of embodiments.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention are described below with reference to the accompanying drawings.

Figure 1:
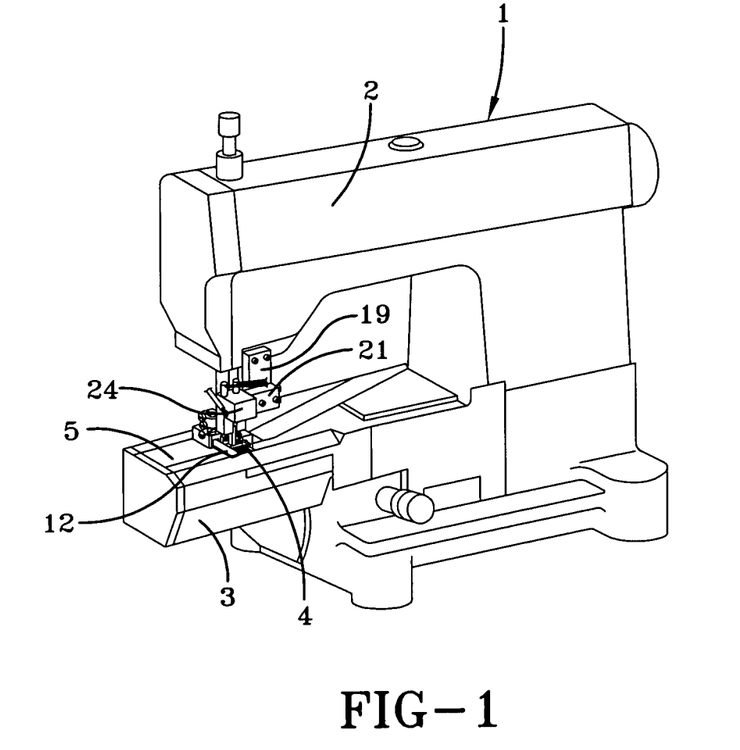
FIG. 1 is an entire appearance perspective view showing an embodiment of a high frequency sewing machine according to the present invention.
Figure 2:
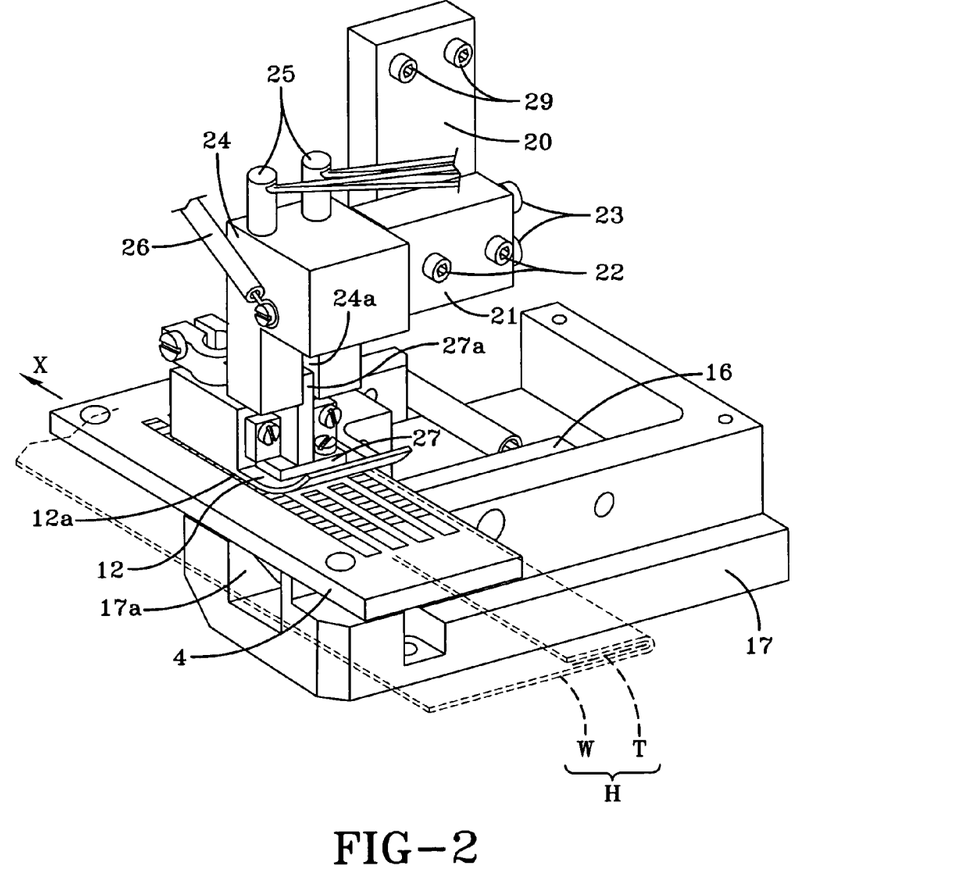
FIG. 2 is an enlarged perspective view of important parts of the high frequency sewing machine.
Figure 3:
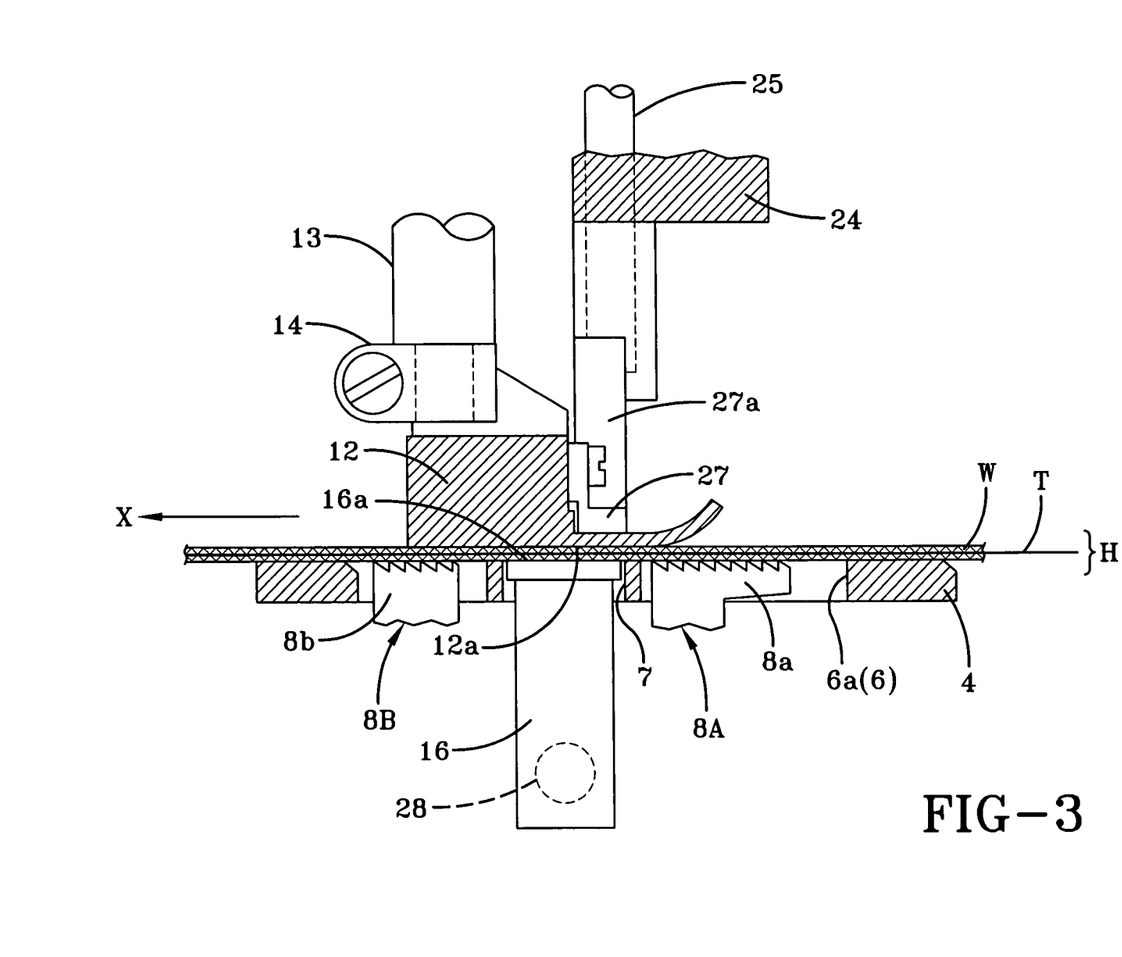
FIG. 3 is an enlarged longitudinal sectional view of the important parts of the high frequency sewing machine.

FIG. 1 is an entire appearance perspective view showing an embodiment of the high frequency sewing machine according to the present invention. FIG. 2 is an enlarged perspective view of important parts of the high frequency sewing machine. FIG. 3 is an enlarged longitudinal sectional view of the important parts of the high frequency sewing machine. In these FIGS. 1 to 3, reference numeral 1 denotes a sewing machine body. The sewing machine body 1 includes a sewing machine arm section 2 and a sewing machine bed section 3.

The outer shell of the bed section 3 is formed in a substantially square tubular shape when viewed from a direction orthogonal to a processing advance direction X. A work material mounting plate (corresponding to a needle plate in a general sewing machine) 4 for slidably and movably mounting a work material H including a fiber cloth W, and a sliding plate 5 are attached to the upper wall of the substantially square tubular shaped bed section 3. The upper surfaces of the work material mounting plate 4 and the sliding plate 5 are substantially flush with the upper surface of the upper wall of the bed section 3. The work material mounting plate 4 is made of engineering plastic which is a material of construction such as polyamide, polyacetal, ABS, or polycarbonate and has wear resistance, corrosion resistance, electrical insulating properties and heat resistance.

Figure 6:
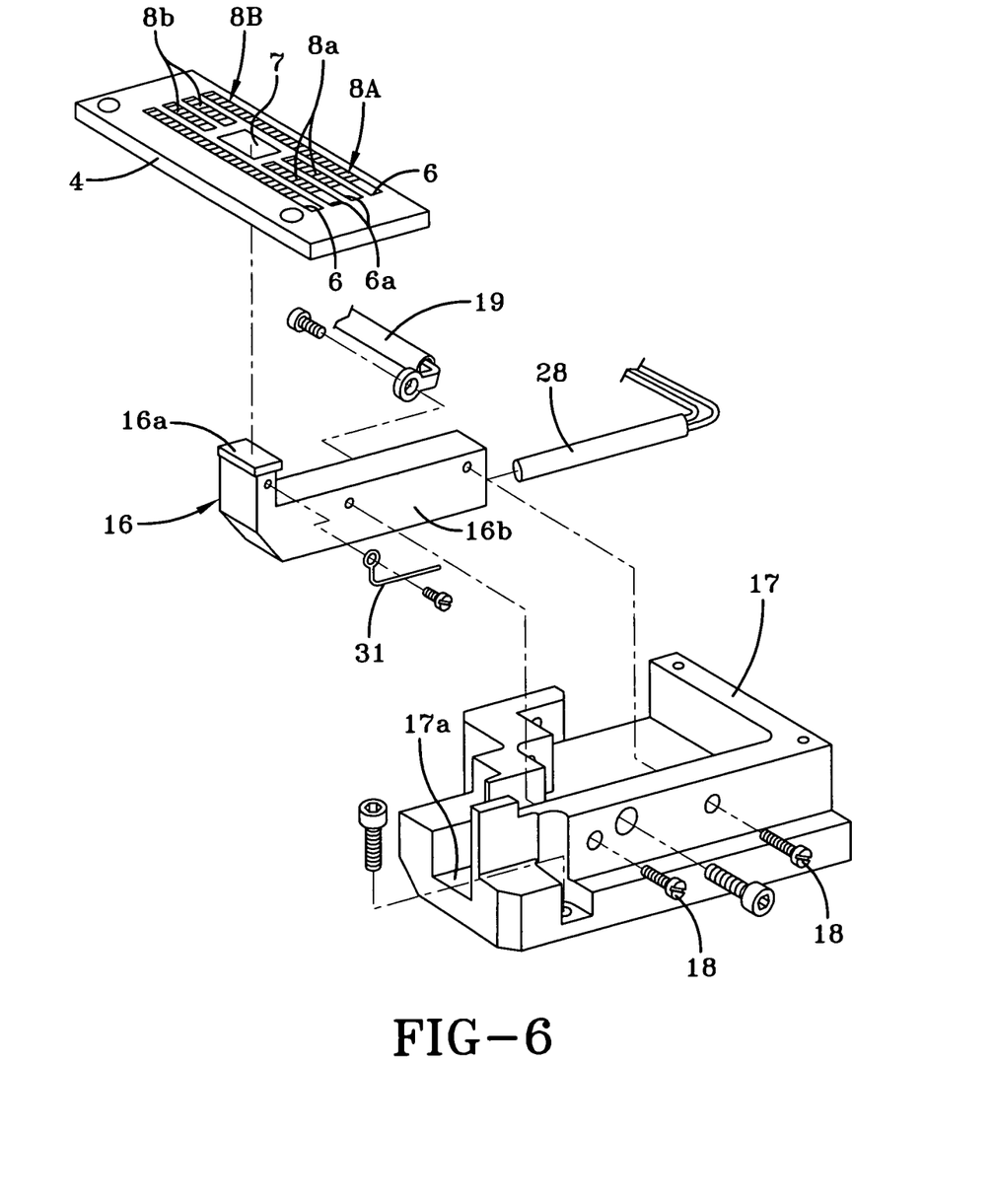
FIG. 6 is an exploded perspective view for explaining the attached state of a lower planar electrode in the high frequency sewing machine.

As shown in FIGS. 2 and 6, four rows of slot-like elongated holes parallel to one another are penetratedly formed in the work material mounting plate 4. Two rows of slot-like elongated holes 6a of these four rows of slot-like elongated holes 6 which are located at the widthwise mid portions of the work material mounting plate 4 are divided at their respective longitudinal mid positions into two front and rear stages in the processing advance direction X with an installation hole 7 of a later-described lower planar positive electrode 16 interposed therebetween. Feed dogs 8 are disposed in these four rows of elongated holes 6. These feed dogs 8 intermittently transfer the work material H mounted on the work material mounting plate 4 along a horizontal plane in a specific direction, namely, the processing advance direction X by a combination of horizontal movement and vertical movement (synthetic circular movement).

Figure 4:
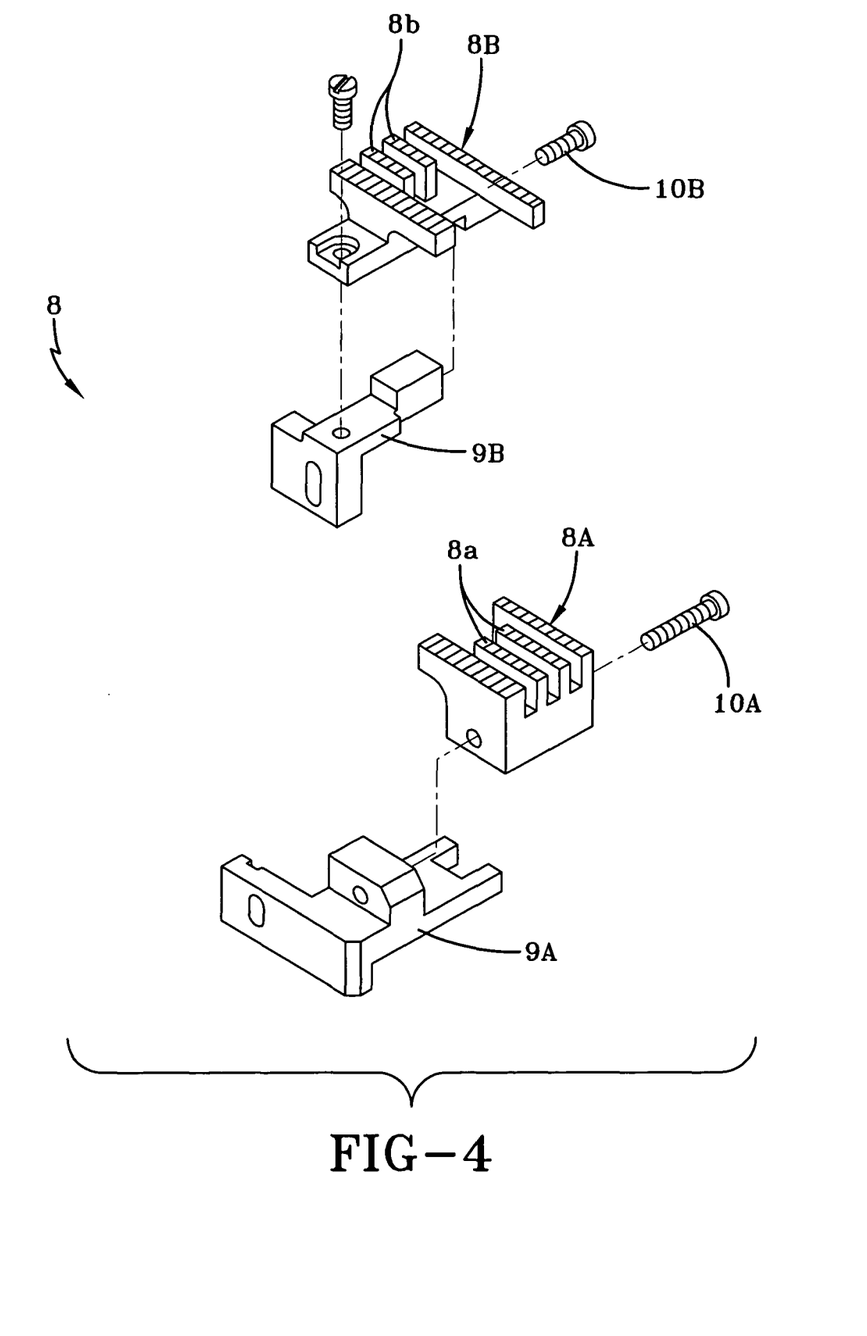
FIG. 4 is an exploded perspective view showing the feed dog construction in the high frequency sewing machine.

As shown in FIG. 4, these feed dogs 8 include a front feed dog 8A including short feed dogs 8a moving within the front elongated hole portions of the slot-like elongated holes 6a divided into the two front and rear stages, and a rear feed dog 8B including short feed dogs 8b moving within the rear elongated portions of the slot-like elongated holes 6a. These front feed dog 8A and the rear feed dog 8B are made of engineering plastic which is a material of construction such as polyamide, polyacetal, ABS, or polycarbonate and has wear resistance, corrosion resistance, electrical insulating properties and heat resistance. These front feed dog 8A and the rear feed dog 8B are respectively fixed through set screws 10A and 10B to a front feed dog mounting base 9A and a rear feed dog mounting base 9B disposed within the bed section 3 below the work material mounting plate 4.

The front feed mounting base 9A and the rear fed dog mounting base 9B are interlockingly connected to a drive mechanism assembled in the bed section 3 so that the front feed dog 8A and the rear feed dog 8B repeat the synthetic circular movement. The feed dog drive mechanism has the same construction as that employed in the general sewing machine, which is well known. Therefore, the detailed description thereof is omitted here.

The feed dogs 8 (the front feed dog 8A and the rear feed dog 8B) and the feed dog drive mechanism constitute the intermittent transfer device alternately repeating the mode for transferring the work material H in the processing advance direction X, and the mode for stopping the transfer.

As the material of construction of the work material mounting plate 4, it is preferable to use super engineering plastic composed of polyetheretherketone resin. In this case, the heat resistance and wear resistance of the work material mounting plate 4 can be further improved.

As the material of construction of the front feed dog 8A and the rear feed dog 8B, it is also preferable to use super engineering plastic composed of polyetheretherketone resin. In this case, the heat resistance and wear resistance of the front and rear feed dogs 8A and 8B can be further improved.

A presser foot 12 is disposed at a location above the work material mounting plate 4 and opposed to the front feed dog 8A and the rear feed dog 8B of the feed dogs 8. The presser foot 12 cooperates with these feed dogs 8 (the front and rear feed dogs 8A and 8B) to transfer the work material H in the processing advance direction X, and also presses the work material H through the resilient force of a spring (not shown) toward the feed dogs 8 so that the work material H does not rise. The presser foot 12 is fixed through a fitting attachment 14 to the lower end of a pressure rod 13 supported at the distal end of arm section 2 so that it can reciprocally move up and down. The pressure rod 13 is movable up and down through the drive mechanism assembled in the arm section 2. That is, the pressure rod 13 moves up and releases the pressure against the work material H during the transfer operation by the feed dogs 8, and it moves down so that the presser foot 12 resiliently presses the work material H during the transfer stopping time.

The presser foot 12 is made of a conductive metal material such as iron or copper. On the other hand, the pressure rod 13 and the fitting attachment 14 are made of electrical insulating and heat resistant material composed of engineering plastic.

The drive mechanism for moving up and down the pressure rod 13 is identical to that employed in the general sewing machine, which is well known. Therefore, the detailed description thereof is omitted here.

Figure 5:
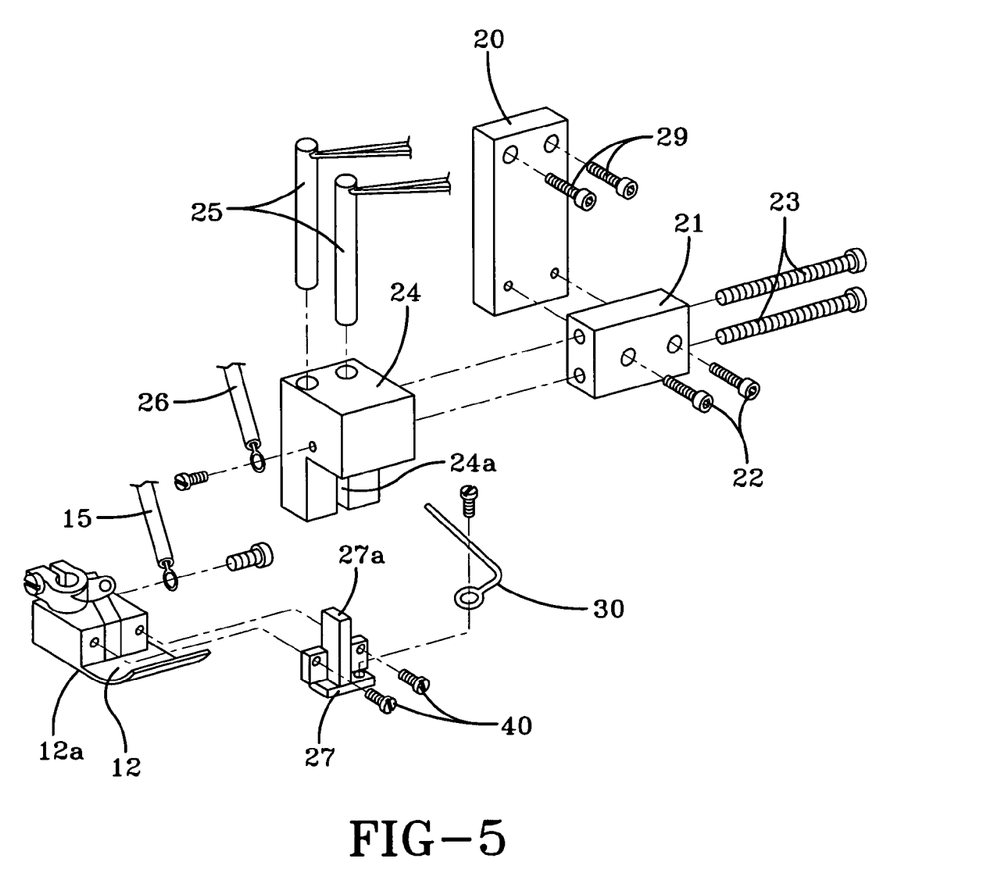
FIG. 5 is an exploded perspective view for explaining the attached state of an upper planar electrode in the high frequency sewing machine.

A hold-down surface 12a of the presser foot 12 has at least a width not less than the transfer width of the feed dogs 8 and is formed along the processing advance direction X. As shown in FIG. 5, a negative electrode line 15 led out of a high frequency power source (not shown) comprised of a high frequency oscillator and a high frequency matching regulator is connected to the side surface of the presser foot 12 made of the conductive material.

This provides the following function. That is, the work material H is intermittently transferred in the processing advance direction X by the cooperation between the reciprocal vertical movement of the presser foot 12 and the up-and-down and back-and-forth synthetic movements of the feed dogs 8. During discontinuation of the transfer, the high frequency power outputted from the high frequency power source is applied through the negative electrode line 15 and a positive electrode line 19 to the presser foot 12 and a planar positive electrode 16 opposed to the lower part of the presser foot 12, so that a thermoplastic resin tape of the work material H held between the presser foot 12 and the positive electrode line 19 is melted under high frequency dielectric heating, and the overlapped end portions of a fiber cloth W of the work material H are bonded together through the melted tape.

Thus, the presser foot 12 has two functions: 1) a hold-down function during the intermittent transfer of the work material H and 2) the upper planar negative electrode during the discontinuation of the intermittent transfer. Because the presser rod 13 and the fitting attachment 14 are made of the electrical insulating and heat resistant material, it is avoidable that when high frequency power is applied to the presser foot 12 so that the presser foot 12 functions as the upper planar negative electrode, the power passes through the presser rod 13 and the fitting attachment 14 to the sewing machine arm section 2 and further to an operator, thereby ensuring the safety of the operator.

Thus, the presser foot 12 also serves as the upper planar negative electrode of the paired electrodes to which high frequency power is applied from the high frequency power source.

An upwardly opening electrode mounting base 17 is secured in the bed section 3 below the work material mounting plate 4 as shown in FIGS. 2 and 6. A recessed groove 17a is formed in the upper surface of the electrode mounting base 17. A lower planar positive electrode 16 whose side surface is connected to the positive electrode line 19 led out of the high frequency electrode source (not shown) is fit into a recessed groove 17a, and also fixed to the electrode mounting base 17 through a set screw 18.

In the lower planar positive electrode 16, an electrode surface 16a having a certain area faces the installation hole 7 formed in the work material mounting plate 4, and is secured to be flush with the upper surface of the work material mounting plate 4.

As shown FIGS. 2 and 5, an insulating block 21 made of engineering plastic is fixed through a set screw 22 to a mounting base 20 fixed to the arm section 2 through a set screw 29. A preheating cartridge heater 25 is insertedly retained in a cartridge heater retainer 24 fixed to the insulating block 21 through a set screw 23, and a ground wire 26 is connected to the preheating cartridge heater 25. A forked vertical sliding groove 24a is formed in the preheating cartridge heater retainer 24. On the other hand, a heat conductive member 27 having an engaging piece 27a engageable into the vertical sliding groove 24a is fixed through a set screw 40 to the upper surface of the upper planar negative electrode 12 whose purpose is served by the presser foot. By engaging the engaging piece 27a of the heat conductive member 27 into the vertical sliding groove 24a of the preheating cartridge heater retainer 24 so as to be relatively slidable up and down, the preheating (heating) caloric value from the preheating cartridge heater 25 is transmitted all the time to the planar negative electrode 12 through the heat conductive member 27 so that the negative electrode 12 can be kept at high temperature.

Additionally, as shown in FIG. 6, a preheating cartridge heater 28 is insertedly retained in a horizontal basal end 16b of the lower planar positive electrode 16 fixed to the electrode mounting base 17. Thus, the preheating (heating) caloric value from the preheating cartridge heater 28 is transmitted all the time to the planar positive electrode 16 so that the positive electrode 16 can be kept at high temperature.

To perform feedback control of the preheating temperatures of the upper planar negative electrode 12 and the lower planar positive electrode 16 in order to keep them at a constant temperature, heat (temperature) sensors 30 and 31 are attached to the side surface of the preheating cartridge heater retainer 24 and the side surface of the lower planar positive electrode 16, respectively.

In the high frequency sewing machine thus constructed, as shown in FIGS. 2 and 3, the work material H, in which the end of the fiber cloth W is turned back and stacked one upon another, and a hot melt (for example, the trade name "DAN-FUSE" manufactured by NITTO BOSEKI CO., LTD.) T that is a thermoplastic resin tape whose both the top and bottom surfaces are bonding surfaces is held between the overlapped end portions thereof, is previously placed at a location on the nearside on the work material mounting plate 4.

The work material H thus prepared is mounted (set) on the upper surface of the work material mounting plate 4, and the sewing machine is then started. By the cooperation between the synthetic movement of the feed dogs 8 (the front and rear feed dogs 8A and 8B of the feed dogs 8) and the vertical reciprocal movement of the presser foot 12, the work material H is intermittently transferred along the horizontal surface in the predetermined processing advance direction X. By heating the paired upper and lower planar electrodes 12 and 16 by applying the high frequency power between the paired electrodes 12 and 16 from the high frequency power source every time the transfer is stopped, the thermoplastic resin tape T held between the overlapped end portions of the fiber cloth W is melted for each certain area, and the overlapped end portions of the fiber cloth W are sequentially bonded together, and the same portions are repeatedly bonded together.

Thus, the overlapped end portions of the fiber cloth W are bonded together through the thermoplastic resin tape T, which is melted in the situation where it makes surface contact for each certain area. Hence, if relatively enhanced high frequency power is applied to the paired electrodes 12 and 16 in order to obtain the assured uniform bonding strength, the heat obtained from the enhanced high frequency power can be dispersed into the surface contact portions between the paired electrodes 12 and 16 without being concentrated at linear or point contact portions. This prevents the occurrence of defective products having burn and burn holes due to heat concentration at the minute area. Consequently, owing to the absence of the defected portions due to the heat concentration and the achievement of assured uniform bonding strength, if the work material H is the fiber cloth W that is weak against heat, satisfactorily finished products can be surely and stably manufactured and processed.

Additionally, the transfer means of the work material H is one which is achieved by the cooperation between the feed dogs 8 which intermittently transfer it along the horizontal surface of the upper surface of the work material mounting plate 4 in the processing advance direction X by the combination of the horizontal movement and the vertical movement, and the presser foot 12 which presses the work material H including the fiber cloth W toward the work material mounting plate 4 so as not to rise during the transfer by the feed dogs 8. It is therefore easy to perform any optional curvilinear transfer besides linear transfer. Even when using the stretchable fiber cloth W, the fiber cloth W can be transferred as it is without exerting excess clamping force. Accordingly, the apparel products having many curvilinear portions and frequently using the stretchable fiber cloth can also be sufficiently handled, thereby surely and stably performing the predetermined bonding process.

As described in the foregoing embodiment, the presser foot 12 also serves as the upper planar electrode, thereby eliminating the need to dispose the upper electrode separately from the presser foot 12. This decreases the number of components and also eliminates the need to dispose and fix the upper electrode at the location of the presser foot 12, and the need to carry out special structural devices for electrical insulating properties of the presser foot. This further simplifies the entire structure and facilitates cost reduction.

Particularly, as described in the foregoing embodiment, when the work material mounting plate 4 and the feed dogs 8 are composed of the material having excellent wear resistance, electrical insulating properties and heat resistance, such as engineering plastic or super engineering plastic, it is capable of sufficiently ensuring the structural strength of the work material mounting plate 4 and the feed dogs 8, and also highly maintaining the durability of the work material mounting plate 4 and the feed dogs 8 which have excellent wear resistance, corrosion resistance, electrical insulating properties and heat resistance and are used under conditions where high frequency power is applied.

As described in the foregoing embodiment, when the preheating cartridge heaters 25 and 28 are annexed to the pair of planar electrodes 12 and 16, respectively, owing to the preheating, the upper and lower electrodes 12 and 16 can be kept at high temperature even during the transfer operation by the feed dogs 8. Therefore, the predetermined bonding strength can be stably obtained by surely melting the resin tape T all the time, while more surely preventing the occurrence of burn or the like due to excessive heating by minimizing the high frequency power applied to these electrodes 12 and 16 during the transfer stopping time.

Further, in the case where the presser foot 12 also serves as the upper planar electrode, between the presser foot 12 serving as the upper planar electrode, and the cartridge heater retainer 24 retaining the preheating cartridge heater 25 which preheats the presser foot 12 and is secured in the arm section 2, the heat conductive member 27 is interposed for connecting the presser foot 12 and the cartridge heater retainer 24 so that both can relatively slide up and down. Consequently, the increase in the weight of the presser foot (upper electrode) 12 is minimized to achieve smooth transfer of the work material H including the fiber cloth W, and facilitates the operation for the curvilinear transfer carried out against the weight of the presser foot 12. Furthermore, the heat of the preheating cartridge heater 25 can be efficiently transmitted to the presser foot 12 through the heat conductive member 27, and the occurrence of burn or the like can be prevented and the stable bonding strength can be ensured owing to the effect of preheating of the electrode 12.

Although the foregoing embodiment showed one in which the presser foot 12 also serves as the upper planar electrode, the upper planar electrode may be disposed separately from the presser foot 12. That is, the presser foot 12 performs only the hold-down function during the intermittent transfer of the work material H. When the upper planar electrode is disposed separately from the presser foot 12, no high frequency power is applied to the presser foot 12. Separately from the presser foot 12, the planar negative electrode may be disposed opposite to the planar positive electrode 16. In this case, each of the presser foot 12, the presser rod 13, and the fitting attachment 14 may be made of a conductive metal material such as iron or copper. In addition, a mechanism for moving up and down the upper planar electrode in synchronism with the moving up and down of the presser foot 12 becomes necessary.

Although the foregoing embodiment described as the intermittent transfer device which uses the feed dogs 8 performing the synthetic circular movement by combining the horizontal movement and the vertical movement, the intermittent transfer device is not limited thereto. For example, it may be one in which the mode for transferring the work material H in the processing advance direction X, and the mode for stopping the transfer are alternately switchable by continuously driving a belt conveyor with a plurality of rows of projections arranged in parallel, and by causing the belt conveyor with the projections to move up and down through an elongated hole formed in the fiber cloth mounting plate 4.

Although the foregoing embodiment employed the cartridge type as the upper and lower preheating heaters, without being limited thereto, an electric heater or the like may be fixedly assembled.

The foregoing embodiment described the application to the so-called tubular sewing machine in which the bed section 3 includes the tubular bed whose shell is formed in the substantially square tubular shape when viewed from the direction orthogonal to the processing advance direction X. In this case, when bonding relatively small tubular portions such as cuffs and necks of various types of apparel, a predetermined bonding operation can be carried out by inserting from the front these tubular portions into the tubular bed section 3, and by subjecting these tubular portions to intermittent transfer so that they are rotated around the bed section 3. This is extremely convenient for handling the work material including the fiber cloth.

Figure 7:
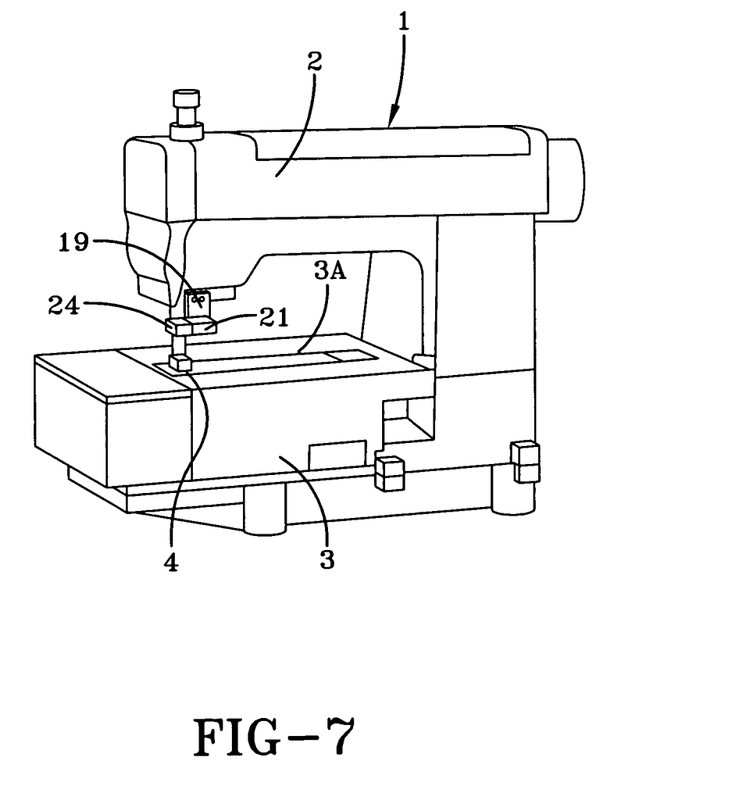
FIG. 7 is an entire appearance perspective view showing another embodiment of the high frequency sewing machine according to the present invention.

The present invention is not limited to the application to the tubular sewing machine described in the foregoing embodiment. For example, the present invention is applicable to a so-called flatbed sewing machines in which the hole of a bed surface 3A of the bed section 3 is shaped as a substantially rectangular flat surface, as shown in FIG. 7. In this case, when bonding, for example, a long portion of a large fiber cloth that is difficult to handle, a predetermined bonding can be surely easily carried out with the entire work material stably supported on the large flat bed surface 3A.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:
   a sewing machine bed section having an upper wall;
   a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprising:
      two outside rows of slot-like elongated holes located along the length of said work material mounting plate;
      two inside rows of slot-like elongated holes located between said two outside rows of slot-like elongated holes, said two inside rows of slot-like elongated holes being divided into a front stage and a rear stage in the processing advance direction X; and
      an installation hole interposed between said front stage and said rear stage of said two inside rows of slot-elongated holes;
   an intermittent transfer device disposed in the bed section below the work material mounting plate, said intermittent transfer device capable of transferring the work material H along the horizontal surface in the processing advance direction, said intermittent transfer device comprising:
      feed dogs having a transfer width on said work material mounting plate and disposed in said two outside rows of slot-like elongated holes and said two inside rows of slot-like elongated holes, said feed dogs including a front feed dog and a rear feed dog; and
      a feed dog drive mechanism for causing said feed dogs to be subjected to synthetic circular movement in vertical and horizontal directions within said two outside rows of slot-like elongated holes and said two inside rows of slot-like elongated holes;
   said intermittent transfer device having an alternately repeating mode for abutting said intermittent transfer device against the lower surface of the work material H mounted on the work material mounting plate and a separating mode for separating said intermittent transfer device from the lower surface of the work material H and alternatively stopping the transfer of the work material H during a transfer stopping time;
   a presser foot having a weight and comprising conductive metal material, said presser foot including a hold-down surface, said hold-down surface having at least a width not less than the transfer width of said feed dogs, said presser foot cooperating with the intermittent transfer device for transferring the work material H in the processing advance direction and alternatively stopping the transfer of the work material H in the processing advance direction during the transfer stopping time;
   a pressure rod;
   a fitting attachment attaching said presser foot to said pressure rod, said pressure rod and said fitting attachment supporting said presser foot and being reciprocally movable up and down;
   said presser foot capable of being reciprocally moved up and down when said pressure rod is moved up and down for resiliently pressing the work material H during the transfer stopping time;
   a lower planar electrode disposed and secured in said bed section below said work material mounting plate, said lower planar electrode comprising an electrode surface flush with the upper surface of said work material mounting plate;
   wherein said presser foot serves as an upper planar electrode for cooperating with said lower planar electrode, said presser foot performing a press function during the intermittent transfer of the work material H and said presser foot performing an upper electrode function during the transfer stopping time;
   at least one preheating heater annexed to each of said presser foot and said lower planar electrode respectively for heating said presser foot and said lower planar electrode;
   a heater retainer for retaining said at least one preheating heater of said presser foot in said heater retainer;
   at least one heat sensor attached to each of said heater retainer and lower planar electrode for performing feedback control to maintain a constant preheating temperature of said presser foot and said lower planar electrode;
   an arm section for operatively supporting said heater retainer;
   a sewing machine body for housing said arm section and said bed section, said heater retainer being operatively connected to the sewing machine body; and
   a heat conductive member for connecting said presser foot and said heater retainer for allowing said heater retainer and said presser foot to slide up and down and for allowing efficient preheating of said presser foot to enable stable bonding strength of the work material H including the fiber cloth W and prevent the occurrence of burn of the work material H including the fiber cloth W, said heat conductive member interposed between said presser foot and said heater retainer allowing a minimal increase in the weight of said presser foot to achieve smooth transfer and operate an optional curvilinear transfer of the work material H including the fiber cloth W and a facilitation of the operation for the optional curvilinear transfer carried out against the weight of said presser foot;

said workpiece mounting plate, said feed dogs, said pressure rod and said fitting attachment being composed of engineering plastic or super engineering plastic;

wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode.

2. The high frequency sewing machine according to claim 1, wherein
said bed section has an outer shell, said outer shell being formed in a substantially square tubular shape when viewed from a direction orthogonal to the processing advance direction.

3. The high frequency sewing machine according to claim 1 wherein said bed section has a bed surface with a hole formed in a shape having a substantially rectangular flat surface.

4. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:

a sewing machine bed section having an upper wall;

a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprising:
two outside rows of slot-like elongated holes located along the length of said work material mounting plate;
two inside rows of slot-like elongated holes located between said two outside rows of slot-like elongated holes, said two inside rows of slot-like elongated holes being divided into a front stage and a rear stage in the processing advance direction X; and
an installation hole interposed between said front stage and said rear stage of said two inside rows of slot-elongated holes;

an intermittent transfer device disposed in the bed section below the work material mounting plate, said intermittent transfer device capable of transferring the work material H along the horizontal surface in the processing advance direction, said intermittent transfer device comprising:
feed dogs having a transfer width on said work material mounting plate and disposed in said two outside rows of slot-like elongated holes and said two inside rows of slot-like elongated holes, said feed dogs including a front feed dog and a rear feed dog; and
a feed dog drive mechanism for causing said feed dogs to be subjected to synthetic circular movement in vertical and horizontal directions within said two outside rows of slot-like elongated holes and said two inside rows of slot-like elongated holes;
said intermittent transfer device having an alternately repeating mode for abutting said intermittent transfer device against the lower surface of the work material H mounted on the work material mounting plate and a separating mode for separating said intermittent transfer device from the lower surface of the work material H and stopping the transfer of the work material H during a transfer stopping time;

a presser foot cooperating with the intermittent transfer device for transferring the work material H in the processing advance direction and alternatively for stopping the transfer of the work material H in the processing advance direction during the transfer stopping time, a lower planar electrode disposed and secured in said bed section below said work material mounting plate, said lower planar electrode comprising an electrode surface flush with the upper surface of said work material mounting plate;

wherein said presser foot serves as an upper planar electrode for cooperating with said lower planar electrode, said presser foot performing a press function during the intermittent transfer of the work material H and said presser foot performing an upper electrode function during the transfer stopping time;

wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode;

said high frequency sewing machine further comprising:
a heater retainer retaining a preheating heater for preheating said presser foot;
an arm section for operatively supporting said heater retainer;
a sewing machine body for housing said arm section and said bed section, said heater retainer being operatively connected to the sewing machine body; and
a heat conductive member for connecting said presser foot and said heater retainer for allowing said heat conductive member and said presser foot to slide up and down, said heat conductive member interposed between said presser foot and said heater retainer.

5. The high frequency sewing machine according to claim 4 further comprising:
a mounting base fixed to said arm section;
an insulating block fixed to said mounting base, said insulating block also being fixed to said heater retainer;
wherein said heater retainer holds said preheating heater of said upper planar electrode.

6. The high frequency sewing machine according to claim 5, said heat conductive member having an engaging piece,
wherein said heater retainer includes a vertical sliding groove for engaging said engaging piece of said heat conductive member for transmitting heat to said presser foot.

7. The high frequency sewing machine according to claim 4, said presser foot having a weight, wherein said heat conductive member is interposed between said presser foot and said heater retainer for allowing a minimal increase in the weight of said presser foot to achieve smooth transfer and operate an optional curvilinear transfer of the work material H including the fiber cloth W and a facilitation of the operation for the optional curvilinear transfer carried out against the weight of said presser foot.

8. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:
- a sewing machine bed section having an upper wall;
- a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprises a material having electrical insulating properties and heat resistant properties, said work material mounting plate comprising:
  - two outside rows of slot-like elongated holes located along the length of said work material mounting plate;
  - two inside rows of slot-like elongated holes located between said two outside rows of slot-like elongated holes, said two inside rows of slot-like elongated holes being divided into a front stage and a rear stage in the processing advance direction X; and
  - an installation hole interposed between said front stage and said rear stage of said two inside rows of slot-elongated holes;
- an intermittent transfer device disposed in the bed section below the work material mounting plate, said intermittent transfer device capable of transferring the work material H along the horizontal surface in the processing advance direction, at least part of said intermittent transfer device comprising a material having electrical insulating properties and heat-resistant properties, said intermittent transfer device comprising:
  - feed dogs having a transfer width on said work material mounting plate and disposed in said two outside rows of slot-like elongated holes and said two inside rows of slot-like elongated holes, said feed dogs including a front feed dog and a rear feed dog; and
  - a feed dog drive mechanism for causing said feed dogs to be subjected to synthetic circular movement in vertical and horizontal directions within said two outside rows of slot-like elongated holes and said two inside rows of slot-like elongated holes;
  - said intermittent transfer device having an alternately repeating mode for abutting said intermittent transfer device against the lower surface of the work material H mounted on the work material mounting plate and a separating mode for separating said intermittent transfer device from the lower surface of the work material H and stopping the transfer of the work material H during a transfer stopping time;
- a presser foot cooperating with the intermittent transfer device for transferring the work material H in the processing advance direction and alternatively for stopping the transfer of the work material H in the processing advance direction during the transfer stopping time,
- a lower planar electrode disposed and secured in said bed section below said work material mounting plate, said lower planar electrode comprising an electrode surface flush with the upper surface of said work material mounting plate;
- wherein said presser foot serves as an upper planar electrode for cooperating with said lower planar electrode, said presser foot performing a press function during the intermittent transfer of the work material H and said presser foot performing an upper electrode function during the transfer stopping time;
- wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode.

9. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:
- a sewing machine bed section having an upper wall;
- a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprising:
  - two outside rows of slot-like elongated holes located along the length of said work material mounting plate;
  - two inside rows of slot-like elongated holes located between said two outside rows of slot-like elongated holes, said two inside rows of slot-like elongated holes being divided into a front stage and a rear stage in the processing advance direction X; and
  - an installation hole interposed between said front stage and said rear stage of said two inside rows of slot-elongated holes;
- an intermittent transfer device disposed in the bed section below the work material mounting plate, said intermittent transfer device capable of transferring the work material H along the horizontal surface in the processing advance direction, said intermittent transfer device comprising:
  - feed dogs having a transfer width on said work material mounting plate and disposed in said two outside rows of slot-like elongated holes and said two inside rows of slot-like elongated holes, said feed dogs including a front feed dog and a rear feed dog, and said feed dogs being made of a material having electrical insulating properties and heat resistant properties, said material is composed of engineering plastic; and
  - a feed dog drive mechanism for causing said feed dogs to be subjected to synthetic circular movement in vertical and horizontal directions within said two outside rows of slot-like elongated holes and said two inside rows of slot-like elongated holes;
  - said intermittent transfer device having an alternately repeating mode for abutting said intermittent transfer device against the lower surface of the work material H mounted on the work material mounting plate and a separating mode for separating said intermittent transfer device from the lower surface of the work material H and stopping the transfer of the work material H during a transfer stopping time;

a presser foot cooperating with the intermittent transfer device for transferring the work material H in the processing advance direction and alternatively for stopping the transfer of the work material H in the processing advance direction during the transfer stopping time;

a lower planar electrode disposed and secured in said bed section below said work material mounting plate, said lower planar electrode comprising an electrode surface flush with the upper surface of said work material mounting plate;

wherein said presser foot serves as an upper planar electrode for cooperating with said lower planar electrode, said presser foot performing a press function during the intermittent transfer of the work material H and said presser foot performing an upper electrode function during the transfer stopping time;

wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode.

10. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:

a sewing machine bed section having an upper wall;

a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprising:

two outside rows of slot-like elongated holes located along the length of said work material mounting plate;

two inside rows of slot-like elongated holes located between said two outside rows of slot-like elongated holes, said two inside rows of slot-like elongated holes being divided into a front stage and a rear stage in the processing advance direction X; and an installation hole interposed between said front stage and said rear stage of said two inside rows of slot-elongated holes;

an intermittent transfer device disposed in the bed section below the work material mounting plate, said intermittent transfer device capable of transferring the work material H along the horizontal surface in the processing advance direction, said intermittent transfer device comprising:

feed dogs having a transfer width on said work material mounting plate and disposed in said two outside rows of slot-like elongated holes and said two inside rows of slot-like elongated holes, said feed dogs including a front feed dog and a rear feed dog; and a feed dog drive mechanism for causing said feed dogs to be subjected to synthetic circular movement in vertical and horizontal directions within said two outside rows of slot-like elongated holes and said two inside rows of slot-like elongated holes;

said intermittent transfer device having an alternately repeating mode for abutting said intermittent transfer device against the lower surface of the work material H mounted on the work material mounting plate and a separating mode for separating said intermittent transfer device from the lower surface of the work material H and stopping the transfer of the work material H during a transfer stopping time;

a presser foot cooperating with the intermittent transfer device for transferring the work material H in the processing advance direction and alternatively for stopping the transfer of the work material H in the processing advance direction during the transfer stopping time;

a lower planar electrode disposed and secured in said bed section below said work material mounting plate, said lower planar electrode comprising an electrode surface flush with the upper surface of said work material mounting plate;

an upwardly opening electrode mounting base secured in said bed section below said work material mounting plate; and a recessed groove formed in said upwardly electrode mounting base for mounting said lower planar electrode;

wherein said presser foot serves as an upper planar electrode for cooperating with said lower planar electrode, said presser foot performing a press function during the intermittent transfer of the work material H and said presser foot performing an upper electrode function during the transfer stopping time;

wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode.

11. A high frequency sewing machine for sewing a work material H along a horizontal surface in a processing advance direction X, said work material H comprising a fiber cloth W having overlapped portions and a thermoplastic resin tape interposed between the overlapped portions of the fiber cloth, said sewing machine comprising:

a sewing machine bed section having an upper wall;

a work material mounting plate having an upper surface, a lower surface, a length and a width, said work material mounting plate being attached to the upper wall of said sewing machine bed section, said work material mounting plate being capable of slidingly movably mounting the work material H, said work material mounting plate comprising:

two outside rows of slot-like elongated holes located along the length of said work material mounting plate;

two inside rows of slot-like elongated holes located between said two outside rows of slot-like elongated holes, said two inside rows of slot-like elongated holes being divided into a front stage and a rear stage in the processing advance direction X; and an installation hole interposed between said front stage and said rear stage of said two inside rows of slot-elongated holes;

an intermittent transfer device disposed in the bed section below the work material mounting plate, said intermittent transfer device capable of transferring the work material H along the horizontal surface in the processing advance direction, said intermittent transfer device comprising:
  feed dogs having a transfer width on said work material mounting plate and disposed in said two outside rows of slot-like elongated holes and said two inside rows of slot-like elongated holes, said feed dogs including a front feed dog and a rear feed dog; and
  a feed dog drive mechanism for causing said feed dogs to be subjected to synthetic circular movement in vertical and horizontal directions within said two outside rows of slot-like elongated holes and said two inside rows of slot-like elongated holes;
  said intermittent transfer device having an alternately repeating mode for abutting said intermittent transfer device against the lower surface of the work material H mounted on the work material mounting plate and a separating mode for separating said intermittent transfer device from the lower surface of the work material H and stopping the transfer of the work material H during a transfer stopping time;
a presser foot cooperating with the intermittent transfer device for transferring the work material H in the processing advance direction and alternatively for stopping the transfer of the work material H in the processing advance direction during the transfer stopping time;
a lower planar electrode disposed and secured in said bed section below said work material mounting plate, said lower planar electrode comprising an electrode surface flush with the upper surface of said work material mounting plate; and
preheating heaters annexed to the presser foot and to the lower planar electrode respectively for heating said presser foot and said lower planar electrode;
said lower planar electrode further comprising a horizontal basal end for holding said preheating heater of said lower planar electrode, said preheating heater of said lower planar electrode transmitting heat to said lower planar electrode;
wherein said presser foot serves as an upper planar electrode for cooperating with said lower planar electrode, said presser foot performing a press function during the intermittent transfer of the work material H and said presser foot performing an upper electrode function during the transfer stopping time;
wherein in a state where the work material H is held between said presser foot and the lower planar electrode by moving down said presser foot during the time when the transfer by the intermittent transfer device is stopped, the overlapped portions of the fiber cloth W are continuously bonded together by allowing the thermoplastic resin tape to melt under high frequency dielectric heating by applying high frequency power between said presser foot and said lower planar electrode.

* * * * *